(12) United States Patent
Lee et al.

(10) Patent No.: US 12,129,317 B2
(45) Date of Patent: Oct. 29, 2024

(54) MODIFIED CONJUGATED DIENE-BASED POLYMER AND RUBBER COMPOSITION INCLUDING THE SAME

(71) Applicant: LG Chem, Ltd., Seoul (KR)

(72) Inventors: Hyoung Woo Lee, Daejeon (KR); Ro Mi Lee, Daejeon (KR); Yu Jin Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 293 days.

(21) Appl. No.: 17/425,550

(22) PCT Filed: Sep. 11, 2020

(86) PCT No.: PCT/KR2020/012329
§ 371 (c)(1),
(2) Date: Jul. 23, 2021

(87) PCT Pub. No.: WO2021/049915
PCT Pub. Date: Mar. 18, 2021

(65) Prior Publication Data
US 2022/0195074 A1     Jun. 23, 2022

(30) Foreign Application Priority Data

Sep. 11, 2019  (KR) .................. 10-2019-0113004
Sep. 10, 2020  (KR) .................. 10-2020-0116401

(51) Int. Cl.
| | |
|---|---|
| C08C 19/25 | (2006.01) |
| C08C 19/22 | (2006.01) |
| C08K 3/013 | (2018.01) |
| C08K 3/04 | (2006.01) |
| C08K 3/36 | (2006.01) |
| C08L 9/06 | (2006.01) |

(52) U.S. Cl.
CPC .............. *C08C 19/25* (2013.01); *C08C 19/22* (2013.01); *C08K 3/013* (2018.01); *C08K 3/04* (2013.01); *C08K 3/36* (2013.01); *C08L 9/06* (2013.01)

(58) Field of Classification Search
CPC ......... C08C 19/25; C08C 19/22; C08C 19/44; C08K 3/013; C08K 3/04; C08K 3/36; C08L 9/06; C08L 15/00; Y02T 10/86
See application file for complete search history.

(56) References Cited

U.S. PATENT DOCUMENTS

| | | | |
|---|---|---|---|
| 4,397,994 A | 8/1983 | Takeuchi et al. | |
| 4,835,216 A | 5/1989 | Morikawa et al. | |
| 5,241,008 A | 8/1993 | Hall | |
| 7,964,674 B2 | 6/2011 | Sasagawa et al. | |
| 8,071,676 B2 | 12/2011 | Matsuda et al. | |
| 8,106,130 B2 * | 1/2012 | Fukuoka ................ | C08C 19/25 |
| | | | 525/379 |
| 8,501,849 B2 | 8/2013 | Cruse et al. | |
| 8,946,339 B2 | 2/2015 | Yoshida et al. | |
| 9,243,090 B2 | 1/2016 | Arriola et al. | |
| 9,315,600 B2 | 4/2016 | Hayata et al. | |
| 9,550,839 B2 | 1/2017 | Kaszas et al. | |
| 10,676,542 B2 * | 6/2020 | Dire ....................... | B60C 1/00 |
| 2003/0100683 A1 | 5/2003 | Toyoizumi et al. | |
| 2004/0106724 A1 | 6/2004 | Toratani et al. | |
| 2004/0254301 A1 | 12/2004 | Tsukimawashi et al. | |
| 2005/0070672 A1 | 3/2005 | Ozawa et al. | |
| 2008/0033110 A1 | 2/2008 | Suzuki et al. | |
| 2009/0203843 A1 | 8/2009 | Fukuoka et al. | |
| 2009/0292043 A1 | 11/2009 | Kurazumi et al. | |
| 2010/0016499 A1 | 1/2010 | Oshima | |
| 2010/0056711 A1 | 3/2010 | Fujii et al. | |
| 2010/0113683 A1 | 5/2010 | Matsumoto et al. | |
| 2010/0152369 A1 | 6/2010 | Shibata et al. | |
| 2010/0179274 A1 | 7/2010 | Jinbo et al. | |
| 2011/0160388 A1 | 6/2011 | Tanaka et al. | |
| 2011/0178233 A1 | 7/2011 | Chaboche et al. | |
| 2011/0275756 A1 | 11/2011 | Ito et al. | |
| 2012/0108737 A1 | 5/2012 | Shibata et al. | |
| 2012/0220716 A1 | 8/2012 | Nakatani et al. | |
| 2013/0023624 A1 | 1/2013 | Sekikawa et al. | |
| 2013/0079464 A1 | 3/2013 | Nishioka et al. | |
| 2013/0085225 A1 | 4/2013 | Nishioka et al. | |

(Continued)

FOREIGN PATENT DOCUMENTS

| | | |
|---|---|---|
| CN | 1411472 A | 4/2003 |
| CN | 1578790 A | 2/2005 |

(Continued)

OTHER PUBLICATIONS

Extended European Search Report for Application No. 20862533.5 dated Jun. 3, 2022, pp. 1-5.
Extended European Search Report for Application No. 20863407.1 dated Jul. 11, 2022, pp. 1-5.
Extended European Search Report including Written Opinion for Application No. 20863524.3 dated Feb. 10, 2022, pp. 1-6.
Extended European Search Report including Written Opinion for Application No. 20864068.0 dated Feb. 25, 2022, pp. 1-8.
International Search Report for Application No. PCT/KR2020/012323, mailed Dec. 16, 2020, pp. 1-3.
International Search Report for Application No. PCT/KR2020/012326, mailed Dec. 21, 2020, pp. 1-3.

(Continued)

*Primary Examiner* — Liam J Heincer
*Assistant Examiner* — Zhen Liu
(74) *Attorney, Agent, or Firm* — Lerner David LLP

(57) ABSTRACT

A modified conjugated diene-based polymer and a rubber composition including the same are disclosed herein. The modified conjugated diene-based polymer has excellent storage stability and excellent processability, tensile strength and viscoelasticity properties. In some embodiments, a modified conjugated diene-based polymer includes a repeating unit derived from a conjugated diene-based monomer, and a functional group derived from an aminoalkoxysilane-based modifier, wherein the rate of change of molecular weight distribution calculated by Mathematical Formula 1 is 10% or less.

11 Claims, No Drawings

(56) References Cited

U.S. PATENT DOCUMENTS

| | | |
|---|---|---|
| 2013/0090422 A1 | 4/2013 | Hinohara et al. |
| 2013/0158205 A1 | 6/2013 | Lee et al. |
| 2014/0031471 A1 | 1/2014 | Rademacher et al. |
| 2014/0088256 A1 | 3/2014 | Fujii |
| 2014/0114014 A1 | 4/2014 | Tokimune et al. |
| 2014/0243476 A1 | 8/2014 | Lee et al. |
| 2014/0256847 A1 | 9/2014 | Sato et al. |
| 2014/0296376 A1 | 10/2014 | Sato et al. |
| 2014/0371383 A1 | 12/2014 | Hayata et al. |
| 2015/0073166 A1 | 3/2015 | Nakatani et al. |
| 2015/0099823 A1 | 4/2015 | Imoto et al. |
| 2015/0166738 A1 | 6/2015 | DeDecker et al. |
| 2015/0252133 A1 | 9/2015 | Morita et al. |
| 2016/0096909 A1 | 4/2016 | Sekikawa et al. |
| 2016/0122480 A1 | 5/2016 | Cho et al. |
| 2016/0347877 A1 | 12/2016 | Lee et al. |
| 2017/0066850 A1 | 3/2017 | Lee et al. |
| 2017/0275400 A1 | 9/2017 | Hirata et al. |
| 2017/0283518 A1 | 10/2017 | Maejima et al. |
| 2017/0291997 A1 | 10/2017 | Cho et al. |
| 2018/0016423 A1 | 1/2018 | Tsukada |
| 2018/0030070 A1 | 2/2018 | Rossle et al. |
| 2018/0030173 A1 | 2/2018 | Kang et al. |
| 2018/0072821 A1 | 3/2018 | Janowski et al. |
| 2018/0162959 A1 | 6/2018 | Choi et al. |
| 2018/0170102 A1 | 6/2018 | Lee et al. |
| 2018/0223006 A1 | 8/2018 | Lee et al. |
| 2018/0223088 A1 | 8/2018 | Sohn et al. |
| 2018/0258194 A1 | 9/2018 | Sohn et al. |
| 2018/0371113 A1 | 12/2018 | Lee et al. |
| 2018/0371114 A1 | 12/2018 | Lee et al. |
| 2019/0002598 A1 | 1/2019 | Lee et al. |
| 2019/0048115 A1 | 2/2019 | Lee et al. |
| 2019/0169406 A1 | 6/2019 | Rossle et al. |
| 2019/0203021 A1 | 7/2019 | Kyo et al. |
| 2019/0233547 A1 | 8/2019 | Mun et al. |
| 2019/0256635 A1 | 8/2019 | Kim et al. |
| 2019/0263956 A1 | 8/2019 | Kim et al. |
| 2019/0300638 A1 | 10/2019 | Cho et al. |
| 2020/0024383 A1 | 1/2020 | Yasumoto et al. |
| 2020/0216578 A1 | 7/2020 | Aoshima et al. |
| 2020/0223968 A1 | 7/2020 | Sohn et al. |
| 2020/0354482 A1 | 11/2020 | Lee et al. |
| 2020/0377636 A1 | 12/2020 | Rössle et al. |
| 2021/0171689 A1 | 6/2021 | Lee et al. |
| 2021/0253767 A1 | 8/2021 | Lee et al. |
| 2021/0301046 A1 | 9/2021 | Sekikawa et al. |

FOREIGN PATENT DOCUMENTS

| | | |
|---|---|---|
| CN | 1592760 A | 3/2005 |
| CN | 101659730 A | 3/2010 |
| CN | 102083889 A | 6/2011 |
| CN | 103764682 A | 4/2014 |
| CN | 106029708 A | 10/2016 |
| CN | 107614538 A | 1/2018 |
| CN | 108026187 A | 5/2018 |
| CN | 108350118 A | 7/2018 |
| CN | 108699179 A | 10/2018 |
| CN | 109563180 A | 4/2019 |
| CN | 109563186 A | 4/2019 |
| CN | 109863186 A | 6/2019 |
| CN | 109890851 A | 6/2019 |
| CN | 109923136 A | 6/2019 |
| CN | 111201255 A | 5/2020 |
| EA | 20173 B1 | 9/2014 |
| EP | 2597117 A1 | 5/2013 |
| EP | 2772514 A1 | 9/2014 |
| JP | H08337614 A | 12/1996 |
| JP | 3378313 B2 | 2/2003 |
| JP | 2010077416 A | 4/2010 |
| JP | 2011080023 A | 4/2011 |
| JP | 2011219701 A | 11/2011 |
| JP | 2011252137 A | 12/2011 |
| JP | 4966652 B2 | 7/2012 |
| JP | 2013108035 A | 6/2013 |
| JP | 2013127064 A | 6/2013 |
| JP | 2013204003 A | 10/2013 |
| JP | 2014055264 A | 3/2014 |
| JP | 2014125543 A * | 7/2014 |
| JP | 2014136758 A | 7/2014 |
| JP | 2014162870 A | 9/2014 |
| JP | 2015007151 A | 1/2015 |
| JP | 2015054910 A | 3/2015 |
| JP | 2015101658 A | 6/2015 |
| JP | 2015120792 A | 7/2015 |
| JP | 2015120803 A | 7/2015 |
| JP | 2016065188 A | 4/2016 |
| JP | 6085077 B2 | 2/2017 |
| JP | 201828047 A | 2/2018 |
| JP | 2018030906 A | 3/2018 |
| JP | 2018035241 A | 3/2018 |
| JP | 2018512385 A | 5/2018 |
| JP | 2018513896 A | 5/2018 |
| JP | 2018119104 A | 8/2018 |
| JP | 2018119106 A | 8/2018 |
| JP | 2018534401 A | 11/2018 |
| JP | 2019501228 A | 1/2019 |
| JP | 2019523805 A | 8/2019 |
| KR | 100237192 B1 | 1/2000 |
| KR | 20080044880 A | 5/2008 |
| KR | 100932356 B1 | 12/2009 |
| KR | 20120083387 A | 7/2012 |
| KR | 20130090811 A | 8/2013 |
| KR | 20130093587 A | 8/2013 |
| KR | 101432412 B1 | 8/2014 |
| KR | 20150060697 A | 6/2015 |
| KR | 20160031712 A | 3/2016 |
| KR | 20160032708 A | 3/2016 |
| KR | 20160042952 A | 4/2016 |
| KR | 20160053521 A | 5/2016 |
| KR | 20160062950 A | 6/2016 |
| KR | 20160067489 A | 6/2016 |
| KR | 20160076248 A | 6/2016 |
| KR | 20160079323 A | 7/2016 |
| KR | 20170000810 A | 1/2017 |
| KR | 20170074677 A | 6/2017 |
| KR | 20170076575 A | 7/2017 |
| KR | 20170076588 A | 7/2017 |
| KR | 20170076596 A | 7/2017 |
| KR | 20170118708 A | 10/2017 |
| KR | 20170121694 A | 11/2017 |
| KR | 20170142492 A | 12/2017 |
| KR | 20180060976 A | 6/2018 |
| KR | 20180064212 A | 6/2018 |
| KR | 20180080639 A | 7/2018 |
| KR | 101926619 B1 | 12/2018 |
| KR | 20190020061 A | 2/2019 |
| KR | 20190030216 A | 3/2019 |
| KR | 20190038287 A | 4/2019 |
| KR | 20190128578 A | 11/2019 |
| KR | 102101005 B1 | 4/2020 |
| KR | 20200078401 A | 7/2020 |
| RU | 2425845 C2 | 8/2011 |
| RU | 2568475 C2 | 11/2015 |
| RU | 2574246 C2 | 2/2016 |
| RU | 2597080 C2 | 9/2016 |
| RU | 2603370 C2 | 11/2016 |
| RU | 2605250 C9 | 4/2017 |
| RU | 2649008 C2 | 3/2018 |
| RU | 2671351 C2 | 10/2018 |
| RU | 2670897 C9 | 12/2018 |
| RU | 2675525 C1 | 12/2018 |
| SG | 10201800555 T | 8/2018 |
| TW | 200829613 A | 7/2008 |
| WO | 2003029299 A1 | 4/2003 |
| WO | 2008123163 A1 | 10/2008 |
| WO | 2008123164 A1 | 10/2008 |
| WO | 2013031599 A1 | 3/2013 |
| WO | 2017216344 A1 | 12/2017 |
| WO | 2018025998 A1 | 2/2018 |
| WO | 2018034194 A1 | 2/2018 |

(56) References Cited

FOREIGN PATENT DOCUMENTS

| WO | 2018034217 A1 | 2/2018 |
| WO | 2018128290 A1 | 7/2018 |
| WO | 2019020752 A1 | 1/2019 |

OTHER PUBLICATIONS

Kozlov, N.A. et al., "Physics of Polymers", Textbook/ Vladimir State University, Vladimir, 2001], p. 345 (p. 230, 234-242, 244-246, 253) [Partial Translation Attached].

Sutyagin, V.M. et al., "Chemistry and Physics of Polymers," Textbook, Tomsk, TPU Publishing House, 2003], p. 208, (p. 132, 140-142, 150-151 and 173) [Partial Translation Attached].

International Search Report for Application No. PCT/KR2020/012316, dated Dec. 16, 2020, 3 pages.

Sun C. et al., "Improvement of Silica Dispersion in Solution Polymerized Styrene-Butadiene Rubber via Introducing Amino Functional Groups" Industrial & Engineering Chemistry Research, Dec. 2018, pp. 1454-1461, vol. 58, American Chemical Society.

Schroot, R. et al., "Accumulative Charging of Redox-Active Side-Chain-Modified Polymers: Experimental and Computational Insights from Oligo—to Polymeric Triarylamines", Macromolecules, Jun. 2019, pp. 4673-4685, vol. 52, American Chemical Society.

International Search Report for Application No. PCT/KR2020/012312 mailed Dec. 16, 2020, pp. 1-2.

International Search Report for PCT/KR2020/012329 mailed Dec. 21, 2020; 2 pages.

Search Report dated Dec. 6, 2022 and Written Opinion dated Dec. 20, 2022 for Singapore Application No. 11202110158P , 10 pages.

Dockendorff et al., Synthesis of Arborescent Polystyrene-g-[poly(2-vinylpyridine)-b-polystyrene] Core-Shell-Corona Copolymers, Journal of PolymerScience Part A: Polymer Chemistry, 2014, vol. 52, No. 8, pp. 1075-1085.

International Search Report for Application No. PCT/KR2020/012319, dated Dec. 16, 2020, 3 pages.

International Search Report for Application No. PCT/KR2020/012333 mailed Dec. 11, 2020, pp. 1-2.

Third Party Observation for European Application No. 20863524.3 issued Sep. 15, 2022. 5 pgs.

"TDS M2520", WeConnectScience, Feb. 15, 2022, LG Chem. 1 pg.

"TDS SOL-5271H", SSBR Technical Data Sheet, Kumho Petrochemical [retrieved from the Notification of the Third Party Observation issued on Sep. 15, 2022 for European Application No. 20863524.3 which is a counterpart of the U.S. Appl. No. 17/420,235]. 1 pg.

"SOLFLEX 30H41", Technical Data Sheet, Goodyear Tire & Rubber Company [retrieved from the Notification of the Third Party Observation issued on Sep. 15, 2022 for European Application No. 20863524.3 which is a counterpart of the U.S. Appl. No. 17/420,235]. 1 pg.

"TDS 2550", WeConnectScience, Feb. 15, 2022, LG Chem. 1 pg.

"TDS 2550H", WeConnectScience, Feb. 15, 2022, LG Chem. 1 pg.

"TDS F3438" WeConnectScience, Feb. 15, 2022, LG Chem. 1 pg.

"TDS F3626E", WeConnectScience,Feb. 15, 2022, LG Chem. 1 pg.

* cited by examiner

MODIFIED CONJUGATED DIENE-BASED POLYMER AND RUBBER COMPOSITION INCLUDING THE SAME

CROSS-REFERENCE TO RELATED APPLICATIONS

The present application is a national phase entry under 35 U.S.C. § 371 of International Application No. PCT/KR2020/012329, filed on Sep. 11, 2020, which claims priority from Korean Patent Application No. 10-2019-0113004, filed on Sep. 11, 2019, and Korean Patent Application No. 10-2020-0116401, filed on Sep. 10, 2020, the entire contents of which are incorporated by reference herein.

TECHNICAL FIELD

The present invention relates to a modified conjugated diene-based polymer which has good storage stability and excellent processability, tensile strength and viscoelasticity properties, and a rubber composition including the same.

BACKGROUND ART

According to the recent demand for cars having a low fuel consumption ratio, a conjugated diene-based polymer having modulational stability represented by wet skid resistance as well as low rotation resistance, and excellent abrasion resistance and tensile properties is required as a rubber material for tires.

In order to reduce the rotation resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as rotation resistance and braking force, required for tires may be controlled, and fuel consumption may be reduced by appropriately adjusting the glass transition temperature. The solution-polymerized SBR is prepared by using an anionic polymerization initiator and is being used by coupling or modifying the chain terminals of the polymer thus formed using various modifiers. For example, U.S. Pat. No. 4,397,994 discloses a method of coupling active anions of the chain terminals of a polymer obtained by polymerizing styrene-butadiene using alkyl-lithium which is a monofunctional initiator in a non-polar solvent, using a coupling agent such as a tin compound.

Meanwhile, the polymerization of the SBR or BR may be performed by a batch type or continuous type polymerization. According to the batch type polymerization, there are advantages in respect of the improvement of physical properties, because the molecular weight distribution of the polymer thus formed is narrow, but productivity is low, and processability is deteriorated. According to the continuous type polymerization, since polymerization is continuously performed, and there are advantages in respect of excellent productivity and the improvement of processability, but molecular weight distribution is wide, and physical properties are deteriorated. Accordingly, research on improving productivity, processability and physical properties at the same time during preparing the SBR or BR is consistently required.

Prior Art Document (Patent Document 1) U.S. Pat. No. 4,397,994 A

DISCLOSURE OF THE INVENTION

Technical Problem

The present invention has been devised to solve the above-mentioned problems of the conventional technique, and an object is to provide a modified conjugated diene-based polymer having the rate of change of molecular weight distribution over time is 10% or less, and excellent storage stability.

In addition, an object of the present invention is to provide a rubber composition including the modified conjugated diene-based polymer and has excellent processability, tensile properties and viscoelasticity properties.

Technical Solution

To solve the above-described tasks, according to an embodiment of the present invention, the present invention provides a modified conjugated diene-based polymer including: a repeating unit derived from a conjugated diene-based monomer; and a functional group derived from an aminoalkoxysilane-based modifier, wherein the rate of change of molecular weight distribution represented by the following Mathematical Formula 1 is 10% or less:

Rate of change of molecular weight distribution (%)=[(|$PDI_2-PDI_1$|)/$PDI_1$]×100     [Mathematical Formula 1]

in Mathematical Formula 1,
$PDI_1$ is molecular weight distribution before standing, and $PDI_2$ is molecular weight distribution after standing for 90 days at 25° C.

Also, the present invention provides a rubber composition including the modified conjugated diene-based polymer and a filler.

Advantageous Effects

The modified conjugated diene-based polymer according to the present invention has the rate of change of molecular weight distribution of 10% or less and excellent storage stability, includes a functional group derived from an aminoalkoxysilane-based modifier and has excellent affinity with a filler, and also includes a derived unit from a macromonomer and has even better affinity with the filler.

The rubber composition according to the present invention includes the modified conjugated diene-based polymer and may show excellent processability, tensile properties and viscoelasticity properties.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries, and the words or terms should be interpreted as having a meaning that is consistent with their meaning of the technical idea of the invention, based on the principle that an inventor may properly define the meaning of the words or terms to best explain the invention.

Definition of Terms

The term "macromonomer" used in the present disclosure is a monomer unit of two or more repeating units derived from a polymerization reactive monomer, and may be combined with a polymer chain or a reactive compound through a terminal group.

The term "polymer" used in the present disclosure refers to a polymer compound prepared by polymerizing monomers of the same or different type. Thus, the common term, polymer refers to a polymer prepared from one type of a monomer, but includes a commonly used homopolymer and a copolymer.

The term "first chain" used in the present invention may mean the molecular chain of a main skeleton forming a polymer, and may mean a chain mainly including repeating units of a conjugated diene-based monomer, or a conjugated diene-based monomer and an aromatic vinyl-based monomer, and the term "second chain" may mean a chain having a smaller number of repeating units than the first chain and mainly including the repeating unit of a N-functional group-containing monomer.

The term "alkyl group" in the present disclosure may mean monovalent aliphatic saturated hydrocarbon, and may include a linear alkyl group such as methyl, ethyl, propyl and butyl; and a branched alkyl group such as isopropyl, sec-butyl, tert-butyl and neo-pentyl.

The term "alkylene group" used in the present disclosure may mean divalent aliphatic saturated hydrocarbon such as methylene, ethylene, propylene and butylene.

The term "heterocyclic group" used in the present disclosure is a cycloalkyl group or an aryl group in which carbon atoms are substituted with one or more heteroatoms, for example, may mean both a heterocycloalkyl group and a heteroaryl group.

The term "substituted" used in the present disclosure may mean that the hydrogen of a functional group, an atomic group or a compound is substituted with a specific substituent. If the hydrogen of a functional group, an atomic group or a compound is substituted with a specific substituent, one or a plurality including two or more of substituents may be present according to the number of hydrogen present in the functional group, the atomic group or the compound, and if a plurality of substituents are present, each substituent may be the same or different.

The term "single bond" used in the present disclosure may mean a single covalent bond itself excluding a separate atomic or molecular group.

The term "derived unit" and "derived functional group" used in the present disclosure may represent a component or a structure comes from a certain material, or the material itself.

The term "vinyl content" used in the present disclosure refers to the mass (or weight) percent of butadiene included in 1 and 2 positions in a polymer chain on the basis of a conjugated diene monomer (butadiene, etc.) moiety in the polymer (on the basis of the total weight of polymerized butadiene).

The term "rate of change of molecular weight distribution (%)" used in the present disclosure represents the degree of change of molecular weight distribution of a polymer over time, for example, represents the difference of molecular weight distribution measured at the initial point of the preparation of the polymer (stood for 0 days) and molecular weight distribution measured after 90 days (stood for 90 days).

The term "rate of change of mooney viscosity (%)" used in the present disclosure represents the degree of change of mooney viscosity of a polymer over time, for example, represents the difference of mooney viscosity measured at the initial point of the preparation of the polymer (stood for 0 days) and mooney viscosity measured after 90 days (stood for 90 days).

It will be further understood that the terms "comprising", "including", and "having" and the derivatives thereof in the present disclosure, though these terms are particularly disclosed or not, do not preclude the presence or addition of optional components, steps, or processes. In order to avoid any uncertainty, all components claimed by using the term "comprising" may include additional additives, auxiliaries, or compounds, including a polymer or other materials, unless described to the contrary. In contrast, the term "consisting essentially of ~" excludes unnecessary ones for operation and precludes optional other components, steps or processes from the scope of optional explanation. The term "consisting of ~" precludes optional components, steps or processes, which are not particularly described or illustrated.

[Measurement Conditions]

In the present disclosure, "weight average molecular weight (Mw)", "number average molecular weight (Mn)", and "molecular weight distribution (MWD)" are measured through gel permeation chromatography (GPC) analysis and are measured by checking a molecular weight distribution curve. The molecular weight distribution (PDI, MWD, Mw/Mn) is calculated from each molecular weight measured. Particularly, the GPC uses two columns of PLgel Olexis (Polymer laboratories Co.) and one column of PLgel mixed-C (Polymer Laboratories Co.) in combination, and polystyrene (PS) is used as a GPC standard material for calculating the molecular weights, and tetrahydrofuran mixed with 2 wt % of an amine compound is used as a GPC measurement solvent.

In the present disclosure, the "mooney viscosity" is measured using a mooney viscometer, particularly, using MV2000E of Monsanto Co. using Large Rotor at a rotor speed of 2±0.02 rpm at 100° C. A polymer is stood at room temperature (23±3° C.) for 30 minutes or more, and 27±3 g of the polymer is collected and put in a die cavity, and then, Platen is operated, while applying torque for measurement.

In the present disclosure, the "N content" may be measured, for example, through an NSX analysis method, and measurement by the NSX analysis method may use a quantitative analyzer of a trace amount of nitrogen (NSX-2100H). For example, in case of using the quantitative analyzer of a trace amount of nitrogen, the quantitative analyzer of a trace amount of nitrogen (Auto sampler, Horizontal furnace, PMT & Nitrogen detector) is turned on, carrier gas flow amounts are set to 250 ml/min for Ar, 350 ml/min for $O_2$, and 300 ml/min for ozonizer, a heater is set to 800° C., and the analyzer is stood for about 3 hours for stabilization. After stabilizing the analyzer, a calibration curve of calibration curve ranges of 5 ppm, 10 ppm, 50 ppm, 100 ppm and 500 ppm is made using Nitrogen standard (AccuStandard S-22750-01-5 ml), and an area corresponding to each concentration is obtained. Then, by using the ratios of concentrations to areas, a straight line is made. After that, a ceramic boat holding 20 mg of a specimen is put in the auto sampler of the analyzer and measurement is conducted to obtain an area. By using the area of the specimen thus obtained and the calibration curve, the N content is calculated. In this case, the specimen is a modified conjugated diene-based polymer from which solvents are removed by putting the specimen in hot water heated by steam and stirring, and may be a specimen from which remaining monomers, remaining modifiers and oil are removed.

In the present disclosure, the "Si content" is measured using an inductively coupled plasma optical emission spectroscopy (ICP-OES; Optima 7300DV) as an ICP analysis method. Particularly, measurement is performed by adding about 0.7 g of a specimen to a platinum (Pt) crucible, adding about 1 mL of concentrated sulfuric acid (98 wt %, electronic grade) thereto, heating at 300° C. for 3 hours, incinerating the specimen in an electrical furnace (Thermo Scientific, Lindberg Blue M) by the following program of steps 1 to 3:

1) step 1: initial temp 0° C., rate (temp/hr) 180° C./hr, temp (holdtime) 180° C. (1 hr),
2) step 2: initial temp 180° C., rate (temp/hr) 85° C./hr, temp (holdtime) 370° C. (2 hr), and
3) step 3: initial temp 370° C., rate (temp/hr) 47° C./hr, temp (holdtime) 510° C. (3 hr),
adding 1 mL of concentrated nitric acid (48 wt %) and 20 µl of concentrated hydrofluoric acid (50 wt %) to a residue, sealing the platinum crucible and shaking for 30 minutes or more, adding 1 mL of boric acid to the specimen, storing at 0° C. for 2 hours or more, diluting in 30 ml of ultrapure water, and performing incineration.

Modified Conjugated Diene-Based Polymer

The present invention provides a modified conjugated diene-based polymer having excellent storage stability and affinity with a filler.

The modified conjugated diene-based polymer according to an embodiment of the present invention includes a repeating unit derived from a conjugated diene-based monomer; and a functional group derived from an aminoalkoxysilane-based modifier, wherein the rate of change of molecular weight distribution represented by Mathematical Formula 1 below is 10% or less.

Rate of change of molecular weight distribution
$(\%) = [(|PDI_2 - PDI_1|)/PDI_1] \times 100$  [Mathematical Formula 1]

In Mathematical Formula 1,
$PDI_1$ is molecular weight distribution before standing, and
$PDI_2$ is molecular weight distribution after standing for 90 days at 25° C.

Generally, a residual group derived from a modifier, for example, an alkoxy group (—OR, where R is a hydrocarbon group) or a hydroxyl group (—OH) is present in a modified conjugated diene-based polymer, and as time goes by, condensation reaction, hydrolysis reaction, etc. may arise from the residual group, and storage stability may be deteriorated, mooney viscosity may increase, molecular weight distribution may increase, and the excellence of the compounding properties of the modified conjugated diene-based polymer may not be maintained, and thus, if used in a rubber composition, there are problems in not achieving desired properties.

However, since the modified conjugated diene-based polymer according to an embodiment of the present invention is prepared by a preparation method including a step of reacting with a macromonomer after performing modification reaction or coupling reaction of an active polymer with a modifier, which will be explained later, a structure in which a derived unit from the macromonomer is bonded to an alkoxy group which is a residual group derived from the modifier present in the polymer may be obtained, and as a result, the residual group derived from the modifier may not be present in the polymer or may be reduced in contrast to the conventional preparation method.

Therefore, the modified conjugated diene-based polymer according to the present invention may have a very low rate of change of molecular weight distribution of 10% or less over time, and may have excellent storage stability and keep excellent compounding properties constantly at the initial point of polymerization or after the lapse of time.

In addition, the modified conjugated diene-based polymer according to an embodiment of the present invention is prepared by the preparation method, which will be explained later, and may have advantages of introducing more functional groups than a case of using only a modifier having lots of functional groups. Particularly, in view of the active polymer and the alkoxy group of the modifier, the coupling of one molecule of the modifier with two or more polymer chains is difficult due to the steric hindrance of the polymer, and though three or more chains may be coupled, a modified polymer in which three or more chains are coupled must be a little. However, according to the preparation method of the present invention, irrespective of the steric hindrance, to the alkoxy residual group of the modifier which is coupled with the polymer chain, the derived unit from the macromonomer may be coupled, and more functional groups may be introduced into the polymer chain.

That is, there are limitations in introducing functional groups in one molecule of the modifier, and though no matter how many functional groups are introduced, there is difference in the absolute amount of the functional groups when compared with a case of coupling a chain including a functional group with an alkoxy residual group without any influence by steric hindrance as in the present invention.

Accordingly, the modified conjugated diene-based polymer according to the present invention may have excellent tensile properties and viscoelasticity properties in contrast to the conventional modified polymer at a single terminal.

Also, since prepared by a preparation method utilizing a residual group derived from a modifier and has nonfunctional properties at one terminal of a polymer, excellent tensile properties and viscoelasticity properties may be achieved in contrast to the conventional modified polymer at both terminals.

In addition, as a conventional method for additionally introducing a functional group to a polymer, an active polymer has been modified with a modifier, and performing condensation reaction of reacting a compound capable of condensing with the Si—O bond of the modifier has been applied. However, if such condensation reaction is used, the bond between a material having an additional functional group and the modified active polymer is formed as —Si—O—Si, and there are probability of arising hydrolysis during subsequent steam stripping step, washing step or storing, and accordingly, there are problems of separating the bond around a condensation bonding part, and at last, losing a functional group.

On the contrary, in the modified conjugated diene-based polymer according to the present invention, the living terminal of the macromonomer reacts with the Si—O—R group of the modifier to form a Si—C bond, and this bond may be a bond not undergoing hydrolysis reaction like a condensed bond and may be free from separation. Accordingly, there may be advantages in that storage stability may be improved, and the generation of defects of losing an initially introduced functional group may not arise.

Hereinafter, the modified conjugated diene-based polymer according to the present invention will be explained more particularly.

The modified conjugated diene-based polymer according to the present invention may have the rate of change of molecular weight distribution of 10% or less, more particularly, 5% or less. Here, the rate of change of molecular weight distribution represents the degree of change of molecular weight distribution according to the lapse of time, and if the degree of change is small, it means that the storage stability of the modified conjugated diene-based polymer is good. The numerical limit of "10% or less" means a technical means for accomplishing the technical task in the present invention.

In addition, the modified conjugated diene-based polymer may have the rate of change of mooney viscosity calculated by Mathematical Formula 2 below of 10% or less, particularly, 5% or less.

Rate of change of mooney viscosity (%)= [(|MV$_2$−MV$_1$|)]/MV$_1$]×100     [Mathematical Formula 2]

In Mathematical Formula 2,

MV$_1$ is mooney viscosity measured at 100° C. of a polymer before standing, and MV$_2$ is mooney viscosity measured at 100° C. of a polymer after standing for 90 days at 25° C.

Here, the rate of change of mooney viscosity represents the degree of change of mooney viscosity over time, and if the degree of change is small, it means that the storage stability of the modified conjugated diene-based polymer is good. The numerical limit of "10% or less" means a technical means for accomplishing the technical task in the present invention.

In another embodiment, the modified conjugated diene-based polymer according to the present invention has the rate of change of molecular weight distribution of 10% or less, and at the same time the rate of change of mooney viscosity of 10% or less, particularly, the rate of change of molecular weight distribution of 5% or less, and the rate of change of mooney viscosity of 5% or less. In this case, the storage stability may be even better.

In another embodiment, according to an embodiment of the present invention, the modified conjugated diene-based polymer may include a repeating unit derived from a conjugated diene-based monomer and a functional group derived from an aminoalkoxysilane-based modifier.

In another embodiment, the modified conjugated diene-based polymer according to an embodiment of the present invention may further include a derived unit from a macromonomer, and the macromonomer may include a repeating unit derived from a N-functional group-containing monomer, or a repeating unit derived from a N-functional group-containing monomer and a repeating unit derived from a conjugated diene-based monomer.

In another embodiment, the modified conjugated diene-based polymer according to an embodiment of the present invention may include a first chain including a repeating unit derived from a conjugated diene-based monomer; a second chain including a derived unit from a macromonomer; and a derived unit from an aminoalkoxysilane-based modifier, wherein the macromonomer may include a repeating unit derived from a N-functional group-containing monomer, or a repeating unit derived from a N-functional group-containing monomer and a repeating unit derived from a conjugated diene-based monomer.

Particularly, the modified conjugated diene-based polymer may be prepared by a preparation method, which will be explained later, including a step of reacting a macromonomer after modification reaction or coupling reaction of an active polymer and a modifier, and through this, may include a repeating unit derived from a conjugated diene-based monomer, a derived unit from a modifier and a derived unit from a macromonomer, more particularly, may include a first chain including a repeating unit derived from a conjugated diene-based monomer; a second chain including a derived unit from a macromonomer; and a derived unit from an aminoalkoxysilane-based modifier.

In addition, the first chain and the second chain may have a coupled and combined structure via the derived unit from a modifier, for example, a structure like a graft copolymer in which the first chain and the second chain derived from the macromonomer is bonded to the derived unit from a modifier which is bonded to at least one terminal of the first chain. Accordingly, in the modified conjugated diene-based polymer, the residual group derived from a modifier, for example, an alkoxy group which is not coupled with the first chain reacts with the macromonomer to remove the alkoxy group and couple the second chain derived from the macromonomer, thereby showing excellent storage stability.

In another embodiment, as described above, if all functional groups are intensively distributed at one terminal of the modified conjugated diene-based polymer and make interaction with silica, only one terminal of the polymer may be coupled with silica, and the other terminal may be in a free state, and accordingly, similar to the conventional modified polymer at a single terminal, effects on the dispersibility of a filler and the prevention of flocculation may be excellent, and processability may be markedly improved. In addition, at one terminal coupled with a functional group, the repeating unit derived from a N-functional group-containing monomer and a derived unit from a modifier are included, and effects by the interaction with a filler may be achieved to the equal or better level as the conventional modified polymer at both terminals, and thus, tensile properties and viscoelasticity properties may become excellent.

The repeating unit derived from the conjugated diene-based monomer may mean a repeating unit formed during polymerizing a conjugated diene-based monomer, and the functional group derived from a modifier may mean a functional group derived from a modifier present at one terminal of at least one polymer chain.

In addition, according to another embodiment of the present invention, the modified conjugated diene-based polymer may further include a repeating unit derived from an aromatic vinyl-based monomer, and in this case, the modified conjugated diene-based polymer may be a copolymer including a repeating unit derived from a conjugated diene-based monomer, a repeating unit derived from an aromatic vinyl monomer, and a functional group derived from a modifier. Here, the repeating unit derived from an aromatic vinyl monomer may mean a repeating unit formed during the polymerization of an aromatic vinyl-based monomer.

According to an embodiment of the present invention, the conjugated diene-based monomer may be one or more selected from the group consisting of 1,3-butadiene, 2,3-dimethyl-1,3-butadiene, piperylene, 3-butyl-1,3-octadiene, isoprene, 2-phenyl-1,3-butadiene and 2-halo-1,3-butadiene (halo means a halogen atom).

The aromatic vinyl monomer may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, 1-vinyl-5-hexylnaphthalene, 3-(2-pyrrolidino ethyl)styrene, 4-(2-pyrrolidino ethyl)styrene and 3-(2-pyrrolidino-1-methyl ehtyl)-α-methylstyrene.

In another embodiment, the modified conjugated diene-based polymer may be a copolymer further including a repeating unit derived from a diene-based monomer of 1 to 10 carbon atoms together with the repeating unit derived from the conjugated diene-based monomer. The repeating unit derived from the diene-based monomer may be a repeating unit derived from a diene-based monomer which is different from the conjugated diene-based monomer, and the diene-based monomer which is different from the conjugated diene-based monomer may be, for example, 1,2-butadiene. If the modified conjugated diene-based polymer is a copolymer further including a diene-based monomer, the modified conjugated diene-based polymer may include the repeating unit derived from the diene-based monomer in an amount of greater than 0 wt % to 1 wt %, greater than 0 wt % to 0.1 wt %, greater than 0 wt % to 0.01 wt %, or greater than 0 wt % to 0.001 wt %, and within this range, effects of preventing gel formation may be achieved.

According to an embodiment of the present invention, the copolymer may be a random copolymer, and in this case, effects of excellent balance between physical properties may be achieved. The random copolymer may mean the arrangement of repeating units forming a copolymer in disorder.

Meanwhile, in the N-functional group-containing monomer, the N-functional group may be basically an amino group, or an aliphatic cyclic amino group, an aliphatic chain type amino group, an aromatic amino group, etc.

Particularly, the N-functional group-containing monomer may be a compound represented by Formula 4 below.

[Formula 4]

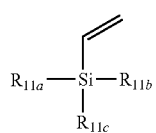

In Formula 4, $R_{11a}$ and $R_{11b}$ are each independently an alkyl group of 1 to 20 carbon atoms; an alkenyl group of 2 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; a heterocyclic group of 3 to 20 carbon atoms; or a functional group represented by Formula 1a below, $R_{11c}$ is an alkenyl group of 2 to 20 carbon atoms, and at least one among $R_{11a}$ and $R_{11b}$ is a functional group represented by Formula 1a.

[Formula 4a]

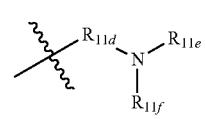

In Formula 4a, $R_{11d}$ is a single bond, a substituted with a substituent or unsubstituted alkylene group of 1 to 20 carbon atoms; a substituted with a substituent or unsubstituted cycloalkylene group of 5 to 20 carbon atoms; or a substituted with a substituent or unsubstituted arylene group of 6 to 20 carbon atoms, wherein the substituent is an alkyl group of 1 to 10 carbon atoms, a cycloalkyl group of 5 to 10 carbon atoms, or an aryl group of 6 to 20 carbon atoms, and $R_{11e}$ and $R_{11f}$ are each independently an alkyl group of 1 to 20 carbon atoms; an alkenyl group of 2 to 20 carbon atoms; an alkynyl group of 2 to 20 carbon atoms; a heteroalkyl group of 1 to 20 carbon atoms; a heteroalkenyl group of 2 to 20 carbon atoms; a heteroalkynyl group of 2 to 20 carbon atoms; a cycloalkyl group of 5 to 20 carbon atoms; an aryl group of 6 to 20 carbon atoms; or a heterocyclic group of 3 to 20 carbon atoms; or a mono-substituted, di-substituted or tri-substituted alkylsilyl group with alkyl groups of 1 to 10 carbon atoms.

Particularly, in Formula 4, $R_{11a}$ and $R_{11b}$ are each independently an alkyl group of 1 to 10 carbon atoms; an alkenyl group of 2 to 10 carbon atoms; an alkynyl group of 2 to 10 carbon atoms; or a functional group represented by Formula 1a, and $R_{11c}$ is an alkenyl group of 1 to 10 carbon atoms, and in Formula 1a, $R_{11d}$ is a single bond or an unsubstituted alkylene group of 1 to 10 carbon atoms, and $R_{11e}$ and $R_{11f}$ are each independently an alkyl group of 1 to 10 carbon atoms; or may be a mono-substituted, di-substituted or tri-substituted alkylsilyl with alkyl groups of 1 to 10 carbon atoms.

In another embodiment, in Formula 4, $R_{11a}$ and $R_{11b}$ are each independently a functional group represented by Formula 1a, and $R_{11c}$ is an alkenyl group of 1 to 6 carbon atoms, in Formula 1a, $R_{11d}$ is a single bond or an unsubstituted alkylene group of 1 to 6 carbon atoms, and $R_{11e}$ and $R_{11f}$ are each independently an alkyl group of 1 to 6 carbon atoms; or may be a mono-substituted, di-substituted or tri-substituted alkylsilyl group with alkyl groups of 1 to 6 carbon atoms.

More particularly, the compound represented by Formula 4 may be one or more selected from the compounds represented by Formula 4-1 to Formula 4-3 below.

[Formula 4-1]

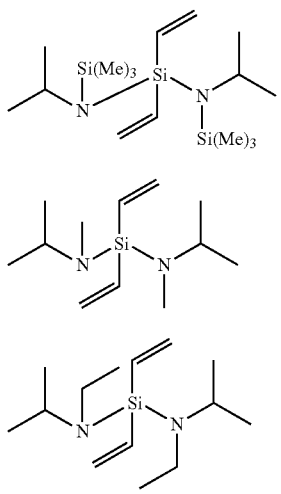

[Formula 4-2]

[Formula 4-3]

In Formula 4-1, Me is a methyl group.

In addition, the modifier may be a modifier having affinity with a filler, for example, a modifier having affinity with silica. The modifier having affinity with silica may mean a modifier containing a functional group having affinity with silica in a compound used as a modifier, and the functional group having affinity with silica may mean a functional group having excellent affinity with a filler, particularly, a silica-based filler, and is capable of making interaction between the silica-based filler and the functional group derived from a modifier.

Particularly, according to an embodiment of the present invention, the modifier may be one or more selected from the compounds represented by Formula 1 to Formula 3 below.

[Formula 1]

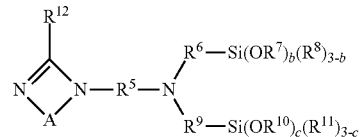

In Formula 1, $A^1$ and $A^2$ are each independently an alkylene group of 1 to 20 carbon atoms, $R^{17}$ to $R^{20}$ are each independently an alkyl group of 1 to 20 carbon atoms, $L^1$ to $L^4$ are each independently a mono-substituted, di-substituted or tri-substituted alkylsilyl group with alkyl groups of 1 to 10 carbon atoms, or an alkyl group of 1 to 20 carbon atoms, and X is an oxygen atom, or an alkylene group of 1 to 20 carbon atoms,

[Formula 2]

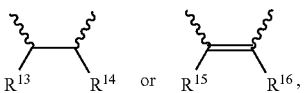

In Formula 2, $R^1$ is a single bond, or an alkylene group of 1 to 10 carbon atoms, $R^2$ and $R^3$ are each independently an alkyl group of 1 to 10 carbon atoms, $R^4$ is hydrogen, an epoxy group, an alkyl group of 1 to 10 carbon atoms, an allyl group of 2 to 10 carbon atoms, a mono-substituted, di-substituted or tri-substituted alkylsilyl group with alkyl groups of 1 to 10 carbon atoms, or a heterocyclic group of 2 to 10 carbon atoms, $R^{21}$ is a single bond, an alkylene group of 1 to 10 carbon atoms, or $—[R^{42}O]_j—$, where $R^{42}$ is an alkylene group of 1 to 10 carbon atoms, and j is an integer selected from 1 to 30, a and m are each independently an integer selected from 1 to 3, and n is an integer of 0 to 2,

[Formula 3]

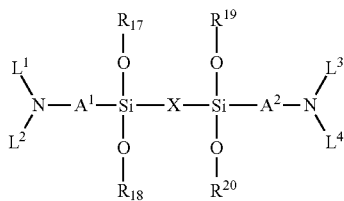

In Formula 3, $R^5$, $R^6$ and $R^9$ are each independently an alkylene group of 1 to 10 carbon atoms, $R^7$, $R^8$, $R^{10}$ and $R^{11}$ are each independently an alkyl group of 1 to 10 carbon atoms, $R^{12}$ is hydrogen or an alkyl group of 1 to 10 carbon atoms, b and c are each independently 1, 2 or 3, where b+c≥4 is satisfied, and A is where $R^{13}$, $R^{14}$, $R^{15}$ and $R^{16}$ are each independently hydrogen or an alkyl group of 1 to 10 carbon atoms.

Particularly, in Formula 1, $A^1$ and $A^2$ are each independently an alkylene group of 1 to 10 carbon atoms, $R^{17}$ to $R^{20}$ are each independently an alkyl group of 1 to 10 carbon atoms, $L^1$ to $L^4$ are each independently a tetravalent alkylsilyl group substituted with an alkyl group of 1 to 5 carbon atoms, or an alkyl group of 1 to 10 carbon atoms, X may be an oxygen atom or an alkylene group of 1 to 10 carbon atoms.

More particularly, in Formula 1, $A^1$ and $A^2$ may be each independently an alkylene group of 1 to 10 carbon atoms, $R^{17}$ to $R^{20}$ may be each independently an alkyl group of 1 to 10 carbon atoms, $L^1$ to $L^4$ may be each independently a tetravalent alkylsilyl group which is substituted with an alkyl group of 1 to 5 carbon atoms, or an alkyl group of 1 to 10 carbon atoms, X may be an oxygen atom or an alkylene group of 1 to 10 carbon atoms.

In a more particular embodiment, the compound represented by Formula 1 may be one selected from the group consisting of 3,3'-(1,1,3,3-tetramethoxydisiloxane-1,3-diyl) bis(N,N-dimethylpropan-1-amine), 3,3'-(1,1,3,3-tetraethoxydisiloxane-1,3-diyl)bis(N,N-dimethylpropan-1-amine), 3,3'-(1,1,3,3-tetrapropoxydisiloxane-1,3-diyl)bis(N,N-dimethylpropan-1-amine), 3,3'-(1,1,3,3- tetramethoxydisiloxane-1,3-diyl)bis(N,N-diethylpropan-1-amine), 3,3'-(1,1,3,3-tetramethoxydisiloxane-1,3-diyl)bis(N,N-dimpropylpropan-1-amine), 3,3'-(1,1,3,3-tetraethoxydisiloxane-1,3-diyl)bis(N,N-diethylpropan-1-amine), 3,3'-(1,1,3,3-tetrapropoxydisiloxane-1,3-diyl)bis(N,N-diethylpropan-1-amine), 3,3'-(1,1,3,3-tetraethoxydisiloxane-1,3-diyl)bis(N,N-dipropylpropan-1-amine), 3,3'-(1,1,3,3-tetrapropoxydisiloxane-1,3-diyl)bis(N,N-dipropylpropan-1-amine), 3,3'-(1,1,3,3-tetramethoxydisiloxane-1,3-diyl)bis(N,N-diethylmethan-1-amine), 3,3'-(1,1,3,3-tetraethoxydisiloxane-1,3-diyl)bis(N,N-diethylmethan-1-amine), 3,3'-(1,1,3,3-tetrapropoxydisiloxane-1,3-diyl)bis(N,N-diethylmethan-1-amine), 3,3'-(1,1,3,3-tetramethoxydisiloxane-1,3-diyl)bis(N,N-dimethylmethan-1-amine), 3,3'-(1,1,3,3-tetramethoxydisiloxane-1,3-diyl)bis(N,N-dipropylmethan-1-amine), 3,3'-(1,1,3,3-tetrapropoxydisiloxane-1,3-diyl)bis(N,N-dimethylmethan-1-amine), 3,3'-(1,1,3,3-tetrapropoxydisiloxane-1,3-diyl)bis(N,N-dipropylmethan-1-amine), 3,3'-(1,1,3,3-tetraethoxydisiloxane-1,3-diyl)bis(N,N-dimethylmethan-1-amine), 3,3'-(1,1,3,3-tetraethoxydisiloxane-1,3-diyl)bis(N,N-dipropylmethan-1-amine), 3,3'-(3,5-dimethoxy-2,6-dioxa-3,5-disilaheptane-3,5-diyl)bis(N,N-diethylpropan-1-amine), 3,3'-(4,6-diethyoxy-3,7-dioxa-4,6-disilanonane-4,6-diyl)bis(N,N-diethylpropan-1-amine), 3,3'-(5,7-dipropoxy-4,8-dioxa-5,7-disilaundecane-5,7-diyl)bis(N,N-diethylpropan-1-amine), N,N'-((1,1,3,3-tetramethoxydisiloxane-1,3-diyl)bis(propan-3,1-diyl))bis(1,1,1-trimethyl-N-(trimethylsilyl)silanamine), N,N'-((1,1,3,3-tetraethoxydisiloxane-1,3-diyl)bis(propan-3,1-diyl))bis(1,1,1-trimethyl-N-(trimethylsilyl)silanamine), N,N'-((1,1,3,3-tetrapropoxydisiloxane-1,3-diyl)bis(propan-3,1-diyl))bis(1,1,1-trimethyl-N-(trimethylsilyl)silanamine), N,N'-((1,1,3,3-tetramethoxydisiloxane-1,3-diyl)bis(propan-3,1-diyl))bis(1,1,1-trimethyl-N-phenylsilanamine), N,N'-((1,1,3,3-tetraethoxydisiloxane-1,3-diyl)bis(propan-3,1-diyl))bis(1,1,1-trimethyl-N-phenylsilanamine), and N,N'-((1,1,3,3-tetrapropoxydisiloxane-1,3-diyl)bis(propan-3,1-diyl))bis(1,1,1-trimethyl-N-phenylsilanamine).

More particularly, the compound represented by Formula 1 may be one or more selected from the compounds represented by Formula 1-1 to Formula 1-3 below.

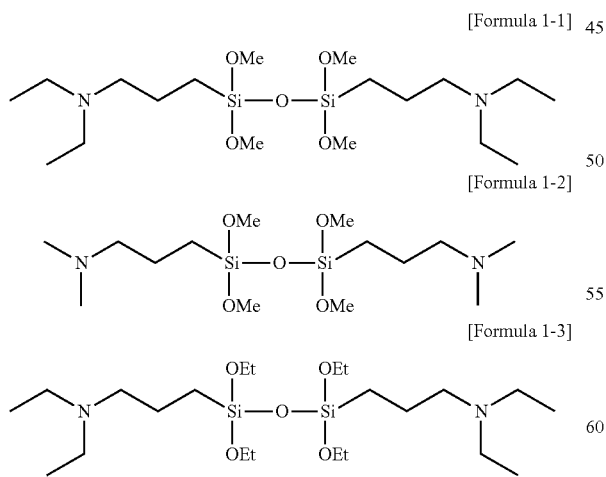

In Formula 1-1 to Formula 1-3, Me is a methyl group, and Et is an ethyl group.

In addition, the compound represented by Formula 2 may particularly be one selected from the group consisting of N,N-bis(3-(dimethoxy(methyl)silyl)propyl)-methyl-1-amine, N,N-bis(3-(diethoxy(methyl)silyl)propyl)-methyl-1-amine, N,N-bis(3-(trimethoxysilyl)propyl)-methyl-1-amine, N,N-bis(3-(triethoxysilyl)propyl)-methyl-1-amine, tri(trimethoxysilyl)amine, tri(3-(trimethoxysilyl)propyl)amine, N,N-bis(3-(diethoxy(methyl)silyl)propyl)-1,1,1-trimethlysilanamine, N-(3-(1H-1,2,4-triazole-1-yl)propyl)-3-(trimethoxysilyl)-N-(3-(trimethoxysilyl)propyl)propan-1-amine, 3-(trimethoxysilyl)-N-(3-(trimethoxysilyl)propyl)-N-(3-(1-(3-(trimehtoxysilyl)propyl)-1H-1,2,4-triazol-3-yl)propyl)propan-1-amine, N-allyl-N-(3-(trimethoxysilyl)propyl)prop-2-en-1-amine), N,N-bis(oxiran-2-ylmethyl)-3-(trimethoxysilyl)propan-1-amine, 1,1,1-trimethyl-N-(3-(triethoxysilyl)propyl)-N-(trimethylsilyl)silanamine) and N,N-bis(3-(triethoxysilyl)propyl)-2,5,8,11,14-pentaoxa-hexadecan-16-amine In another embodiment, the compound represented by Formula 2 may be one or more selected from the compounds represented by Formula 2-1 and Formula 2-2 below.

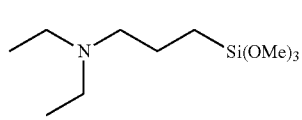

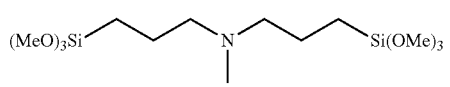

In Formula 2-1 or Formula 2-2, Me is a methyl group.

In addition, the compound represented by Formula 3 may particularly be one selected from the group consisting of N-(3-(1H-imidazol-1-yl)propyl)-3-(triethoxysilyl)-N-(3-(triethoxysilyl)propyl)propan-1-amine, N-(3-(1H-imidazol-1-yl) propyl)-3-(trimethoxysilyl)-N-(3-(trimethoxysilyl) propyl)propan-1-amine and 3-(4,5-dihydro-1H-imidazol-1-yl)-N,N-bis(3-(triethoxysilyl)propyl)propan-1-amine.

More particularly, the compound represented by Formula 3 may be a compound represented by Formula 3-1 below.

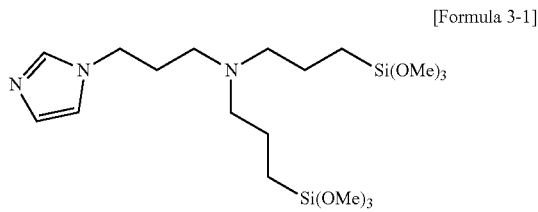

In Formula 3-1, Me is a methyl group.

The modified conjugated diene-based polymer according to an embodiment of the present invention may have a number average molecular weight (Mn) of 1,000 g/mol to 2,000,000 g/mol, 10,000 g/mol to 1,000,000 g/mol, or 100,000 g/mol to 800,000 g/mol, and a weight average molecular weight (Mw) of 1,000 g/mol to 3,000,000 g/mol, 10,000 g/mol to 2,000,000 g/mol, or 100,000 g/mol to 2,000,000 g/mol. Within the ranges, excellent effects of rotation resistance and wet skid resistance may be achieved. In another embodiment, the modified conjugated diene-based polymer may have molecular weight distribution (PDI; MWD; Mw/Mn) of 1.0 to 3.0, or 1.1 to 2.5, or 1.1 to 2.0, and within this range, excellent effects of tensile properties, viscoelasticity properties, and balance between physical properties may be achieved. Here, the molecular weight distribution may represent a value measured at an initial point of the preparation of a polymer (stood for 0 days).

Also, the modified conjugated diene-based polymer may have mooney viscosity at 100° C. of 30 or more, 40 to 150, or 40 to 140, and within this range, excellent effects of processability and productivity may be achieved. Here, the mooney viscosity may represent a value measured at an initial point of the preparation of a polymer (stood for 0 days).

In another embodiment, the modified conjugated diene-based polymer may have the Si content of 100 ppm or more, 100 ppm to 10,000 ppm, or 100 ppm to 5,000 ppm. Within this range, a rubber composition including the modified conjugated diene-based polymer has effects of excellent mechanical properties such as tensile properties and viscoelasticity properties. The Si content may mean the amount of Si atoms present in the modified conjugated diene-based polymer. Meanwhile, the Si atom may be derived from the functional group derived from a modifier.

In another embodiment, the modified conjugated diene-based polymer may have the N content of 70 ppm or more, 100 ppm or more, 100 ppm to 10,000 ppm, or 100 ppm to 5,000 ppm.

Within this range, a rubber composition including the modified conjugated diene-based polymer has effects of excellent mechanical properties such as tensile properties and viscoelasticity properties. The N content may mean the amount of nitrogen atoms present in the modified conjugated diene-based polymer, and in this case, the nitrogen atom may be derived from the functional group derived from a modifier.

In addition, the vinyl content of the modified conjugated diene-based polymer may be 5 wt % or more, 10 wt % or more, or 10 wt % to 60 wt %. Here, the vinyl content may mean the amount of not 1,4-added but 1,2-added conjugated diene-based monomer with respect to 100 wt % of a conjugated diene-based copolymer composed of a monomer having a vinyl group and an aromatic vinyl-based monomer.

Method for Preparing Modified Conjugated Diene-Based Polymer

In addition, the modified conjugated diene-based polymer of the present invention may be prepared by a preparation method explained below.

The method for preparing the modified conjugated diene-based polymer according to an embodiment of the present invention is characterized in including polymerizing a conjugated diene-based monomer, or a conjugated diene-based monomer and an aromatic vinyl monomer in the presence of a polymerization initiator in a hydrocarbon solvent to prepare an active polymer (S1); reacting or coupling the active polymer with an aminoalkoxysilane-based modifier to prepare a modified active polymer (S2); and reacting the modified active polymer and a macromonomer (S3).

In addition, the conjugated diene-based monomer, aromatic vinyl monomer and aminoalkoxysilane-based modifier are the same as described above.

The hydrocarbon solvent is not specifically limited, but may be, for example, one or more selected from the group consisting of n-pentane, n-hexane, n-heptane, isooctane, cyclohexane, toluene, benzene and xylene.

According to an embodiment of the present invention, the polymerization initiator may be used in 0.01 mmol to 10 mmol, 0.05 mmol to 5 mmol, 0.1 mmol to 2 mmol, 0.1 mmol to 1 mmol, or 0.15 to 0.8 mmol based on total 100 g of the monomer. Also, the polymerization initiator is not specifically limited, but may be, for example, one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

S1 Step

The polymerization of step (S1) may be, for example, anionic polymerization, and particularly, a living anionic polymerization by which an anionic active part is included at the polymerization terminal through a propagation polymerization reaction by anions. In addition, the polymerization of step (S1) may be a polymerization with heating, an isothermal polymerization, or a polymerization at a constant temperature (adiabatic polymerization). Here, the polymerization at a constant temperature means a polymerization method including a step of polymerizing using self-generated heat of reaction without optionally applying heat after adding a polymerization initiator, and the polymerization with heating means a polymerization method including injecting the polymerization initiator and then, increasing the temperature by optionally applying heat. The isothermal polymerization means a polymerization method by which the temperature of a polymer is kept constant by increasing heat by applying heat or taking heat after adding the polymerization initiator.

In addition, according to an embodiment of the present invention, the polymerization of step (S1) may be performed by further adding a diene-based compound of 1 to 10 carbon atoms in addition to the conjugated diene-based monomer, and in this case, effects of preventing the formation of gel on the wall of a reactor during operation for a long time may be achieved. The diene-based compound may be, for example, 1,2-butadiene.

The polymerization of step (S1) may be performed in a temperature range of, for example, 80° C. or less, −20° C. to 80° C., 0° C. to 80° C., 0° C. to 70° C., or 10° C. to 70° C., and within the range, the molecular weight distribution of a polymer is controlled narrow, and the improving effects of physical properties were excellent.

The first active polymer prepared by step (S1) may mean a polymer in which a polymer anion and an organometallic cation are coupled.

Meanwhile, the polymerization of step (S1) may be performed by including a polar additive, and the polar additive may be added in a ratio of 0.001 g to 50 g, 0.001 g to 10 g or 0.005 g to 0.1 g based on total 100 g of the monomer. In another embodiment, the polar additive may be added in a ratio of 0.001 g to 10 g, 0.005 g to 5 g, 0.005 g to 4 g based on total 1 mmol of the polymerization initiator.

The polar additive may be, for example, one or more selected from the group consisting of tetrahydrofuran, 2,2-di(2-tetrahydrofuryl)propane, diethyl ether, cycloamyl ether, dipropyl ether, ethylene methyl ether, ethylene dimethyl ether, diethyl glycol, dimethyl ether, tert-butoxy ethoxy ethane, bis(3-dimethylaminoethyl) ether, (dimethylaminoethyl) ethyl ether, trimethylamine, triethylamine, tripropylamine, N,N,N',N'-tetramethylethylenediamine, sodium mentholate and 2-ethyl tetrahydrofufuryl ether, preferably, triethylamine, tetramethylethylenediamine, sodium mentholate or 2-ethyl tetrahydrofufuryl ether. If the polar additive is included, and if a conjugated diene-based monomer, a conjugated diene-based monomer and an aromatic vinyl-based monomer are copolymerized, the difference of their reaction rates may be compensated, and effects of inducing easy formation of a random copolymer may be achieved.

S2 Step

The (S2) step is a step of reacting the active polymer with an aminoalkoxysilane-based modifier to prepare a modified active polymer, and here, the reaction may be modification or coupling reaction, and in this case, the modifier may be used in an amount of 0.01 mmol to 10 mmol based on total 100 g of the monomer.

In another embodiment, the modifier may be used in a molar ratio of 1:0.1 to 10, 1:0.1 to 5, or 1:0.1 to 1:3, based on 1 mol of the polymerization initiator in step (S1).

S3 Step

In addition, the (S3) step is a step of reacting the modified active polymer with a macromonomer to prepare a modified conjugated diene-based polymer.

In addition, the preparation method according to an embodiment of the present invention may further include a step of preparing a macromonomer prior to the (S3) step, and the step of preparing the macromonomer may be performed by the polymerization reaction of a N-functional group-containing monomer, or a N-functional group-containing monomer and a conjugated diene-based monomer in the presence of an organolithium compound in a hydrocarbon solvent. In this case, the polymerization reaction may be living anionic polymerization to give an anionic active part at the polymerization terminal by the propagation polymerization reaction by anions, and the macromonomer may be a living anion terminal of which one terminal is capable of acting as a monomer.

Here, the organolithium compound may be an alkyllithium compound, and may particularly be methyllithium, ethyllithium, propyllithium, isopropyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, or 4-cyclopentyl lithium, more particularly, n-butyllithium.

In addition, the macromonomer may be used in 0.1 to 4.0 mol, 0.1 to 2.0 mol, or 0.5 mol to 1.5 mol based on 1 mol of the polymerization initiator.

Meanwhile, the (S3) step may be for preparing a modified conjugated diene-based polymer by reacting the modified active polymer and the conjugated diene-based macromonomer, i.e., the functional group derived from a modifier in the modified active polymer and the living anion terminal of the macromonomer.

Particularly, the modified active polymer chain prepared in the (S2) step includes the functional group derived from a modifier, and the functional group derived from a modifier includes an alkoxy group not reacted with a polymer chain but remaining, and accordingly, through the reaction of the living anion terminal of the macromonomer and the alkoxy group, the modified conjugated diene-based polymer may be prepared.

In addition, the modified active polymer prepared in the (S2) step includes an alkoxy group which is a residual group not reacted with the active polymer, derived from a modifier, and through the reaction with the conjugated diene-based macromonomer, the alkoxy group and the conjugated diene-based macromonomer react to remove the alkoxy group to make a bond with the derived unit from the macromonomer, thereby preparing a modified conjugated diene-based polymer having a very low rate of change of molecular weight distribution over time of 10% or less and excellent storage stability.

Rubber Composition

Also, the present invention provides a rubber composition including the modified conjugated diene-based polymer.

The rubber composition may include the modified conjugated diene-based polymer in an amount of 10 wt % or more, 10 wt % to 100 wt %, or 20 wt % to 90 wt %, and within this range, mechanical properties such as tensile strength and abrasion resistance are excellent, and effects of excellent balance between physical properties may be achieved.

In addition, the rubber composition may further include other rubber component, as necessary, in addition to the modified conjugated diene-based polymer, and in this case, the rubber component may be included in an amount of 90 wt % or less based on the total weight of the rubber composition. In a particular embodiment, the rubber component may be included in an amount of 1 part by weight to 900 parts by weight based on 100 parts by weight of the modified conjugated diene-based polymer.

The rubber component may be, for example, a natural rubber or a synthetic rubber, and may particularly be a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, and a halogenated butyl rubber, and any one among them or mixtures of two or more thereof may be used.

The rubber composition may include a filler of 0.1 parts by weight to 200 parts by weight, or 10 parts by weight to 120 parts by weight based on 100 parts by weight of the modified conjugated diene-based polymer of the present invention. The filler may be, for example, a silica-based filler, particularly, wet silica (hydrated silicate), dry silica (anhydrous silicate), calcium silicate, aluminum silicate, or colloid silica. Preferably, the filler may be wet silica which has the most significant improving effect of destruction characteristics and compatible effect of wet grip. In addition, the rubber composition may further include a carbon-based filler, as necessary.

In another embodiment, if silica is used as the filler, a silane coupling agent may be used together for the improvement of reinforcing and low exothermic properties. Particular examples of the silane coupling agent may include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one among them or mixtures of two or more thereof may be used. Preferably, bis(3-triethoxysilylpropyl)polysulfide or 3-trimethoxysilylpropylbenzothiazyltetrasulfide may be used in consideration of the improving effect of reinforcing properties.

In addition, in the rubber composition according to an embodiment of the present invention, since a modified conjugated diene-based polymer in which a functional group having high affinity with silica is introduced into an active part is used as a rubber component, the compounding amount of the silane coupling agent may be smaller than a common case. Thus, the silane coupling agent may be used in an amount of 1 part by weight to 20 parts by weight, or 5 parts by weight to 15 parts by weight based on 100 parts by weight of silica. Within the above amount range, effects as a coupling agent may be sufficiently exhibited, and preventing effects of gelation of a rubber component may be achieved.

The rubber composition according to an embodiment of the present invention may be sulfur crosslinkable, and so may further include a vulcanizing agent. The vulcanizing agent may particularly be a sulfur powder and may be included in an amount of 0.1 parts by weight to 10 parts by weight based on 100 parts by weight of the rubber component. Within the above amount range, elasticity and strength required for a vulcanized rubber composition may be secured, and at the same time, an excellent low fuel consumption ratio may be achieved.

The rubber composition according to an embodiment of the present invention may further include various additives used in a common rubber industry in addition to the above components, particularly, a vulcanization accelerator, a process oil, an antioxidant, a plasticizer, an antiaging agent, a scorch preventing agent, a zinc white, stearic acid, a thermosetting resin, or a thermoplastic resin.

The vulcanization accelerator may include, for example, thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG), in an amount of 0.1 parts by weight to 5 parts by weight based on 100 parts by weight of the rubber component.

The process oil acts as a softener in a rubber composition and may include, for example, a paraffin-based, naphthene-based, or aromatic compound. An aromatic process oil may be used in consideration of tensile strength and abrasion resistance, and a naphthene-based or paraffin-based process oil may be used in consideration of hysteresis loss and properties at a low temperature. The process oil may be included in an amount of 100 parts by weight or less based on 100 parts by weight of the rubber component. Within the above-described range, the deterioration of the tensile strength and low exothermic properties (low fuel consumption ratio) of the vulcanized rubber may be prevented.

The antioxidant may include, for example, 2,6-di-t-butyl paracresol, dibutylhydroxytoluenyl, 2,6-bis((dodecylthio)methyl)-4-nonylphenol or 2-methyl-4,6-bis((octylthio)methyl)phenol, and may be used in an amount of 0.1 parts by weight to 6 parts by weight based on 100 parts by weight of the rubber component.

The antiaging agent may include, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature, in an amount of 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to a compounding prescription. A rubber composition having low exothermic properties and good abrasion properties may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

Also, the present invention provides a tire manufactured using the rubber composition.

The tire may include a tire or a tire tread.

Hereinafter, the present invention will be explained in more detail referring to embodiments. However, embodiments according to the present invention may be modified into various other types, and the scope of the present invention should not be limited to the embodiments described below. The embodiments of the present invention are provided for completely explaining the present invention to a person having an average knowledge in the art.

Preparation Example

To a 500 ml, round-bottom flask, 100 ml of tetrahydrofuran and 1 g of n-butyllithium (10 wt % in n-hexane) were added, N,N'-diethyl-N,N'-diisopropyl-1,1-divinylsilanediamine (in a ratio of 3 mol in contrast to 1 mol of [act. Li]) was added, followed by reacting at 10° C. for 30 minutes to prepare a solution containing a macromonomer (15.6 mmol/l). Through GC analysis, the molecular weight of the macromonomer was confirmed, and the achievement of the reaction was confirmed.

Example 1

To a 20 L, autoclave reactor, 3 kg of n-hexane, 215 g of styrene, 745 g of 1,3-butadiene and 1.29 g of 2,2-bis(2-oxolanyl)propane as a polar additive were injected, then, 3.2 g of n-butyllithium (10 wt % in n-hexane) was injected, the internal temperature of the reactor was adjusted to 60° C., and an adiabatic reaction with heating was performed. After about 30 minutes lapse, 39 g of 1,3-butadiene was injected for capping the terminals of a polymer with butadiene. After about 10 minutes, 3,3'-(1,1,3,3-tetramethoxydisiloxane-1,3-diyl)bis(N,N-ethylpropan-1-amine) was injected as a modifier and reacted for 15 minutes (molar ratio of [DTP]:[act. Li]=1.5:1, molar ratio of [modifier]:[act. Li]=0.7:1). Then, the macromonomer prepared in the Preparation Example was added and reacted for 15 minutes (molar ratio of [macromonomer]:[act. Li]=1:1), and the reaction was quenched using ethanol. 33 g of a solution in which 30 wt % of Wingstay K antioxidant was dissolved in hexane was added thereto. The polymer thus obtained was injected into hot water heated using steam and stirred to remove solvents and roll dried to remove remaining solvents and water to prepare a modified styrene-butadiene copolymer.

Example 2

A modified styrene-butadiene copolymer was prepared by performing the same method as in Example 1 except for adding N-methyl-3-(trimethoxysilyl)-N-(3-(trimethoxysilyl)propyl)propane-1-amine instead of 3,3'-(1,1,3,3-tetramethoxydisiloxane-1,3-diyl)bis(N,N-ethylpropan-1-amine) as a modifier (molar ratio of [modifier]:[act. Li]=0.7:1).

Example 3

A modified styrene-butadiene copolymer was prepared by performing the same method as in Example 1 except for adding N-(3-(1H-imidazol-1-yl)propyl)-3-(trimethosysilyl)-N-(3-(trimethoxysilyl)propyl)propan-1-amine instead of 3,3'-(1,1,3,3-tetramethoxydisiloxane-1,3-diyl)bis(N,N-ethylpropan-1-amine) as a modifier (molar ratio of [modifier]:[act. Li]=0.7:1).

Comparative Example 1

To a 20 L, autoclave reactor, 3 kg of n-hexane, 215 g of styrene, 745 g of 1,3-butadiene and 1.29 g of 2,2-bis(2-oxolanyl)propane as a polar additive were injected, then, 3.2 g of n-butyllithium (10 wt % in n-hexane) was injected, the internal temperature of the reactor was adjusted to 60° C., and an adiabatic reaction with heating was performed. After about 30 minutes lapse, 39 g of 1,3-butadiene was injected for capping the terminals of a polymer with butadiene. After about 10 minutes, 3,3'-(1,1,3,3-tetramethoxydisiloxane-1,3-diyl)bis(N,N-ethylpropan-1-amine) was injected as a modifier and reacted for 15 minutes (molar ratio of [DTP]:[act. Li]=1.5:1, molar ratio of [modifier]:[act. Li]=0.7:1). Then, the reaction was quenched using ethanol. 33 g of a solution in which 30 wt % of Wingstay K antioxidant was dissolved in hexane was added thereto. The polymer thus obtained was injected into hot water heated using steam and stirred to remove solvents and roll dried to remove remaining solvents and water to prepare a modified styrene-butadiene copolymer.

Comparative Example 2

A modified styrene-butadiene copolymer was prepared by performing the same method as in Comparative Example 1 except for adding N-methyl-3-(trimethoxysilyl)-N-(3-(trimethoxysilyl)propyl)propane-1-amine instead of 3,3'-(1,1,3,3-tetramethoxydisiloxane-1,3-diyl)bis(N,N-ethylpropan-1-amine) as a modifier (molar ratio of [modifier]:[act. Li]=0.7:1).

Comparative Example 3

A modified styrene-butadiene copolymer was prepared by performing the same method as in Comparative Example 1 except for adding N-(3-(1H-imidazol-1-yl)propyl)-3-(trimethoxysilyl)-N-(3-(trimethoxysilyl)propyl)propan-1-amine) instead of 3,3'-(1,1,3,3-tetramethoxydisiloxane-1,3-diyl)bis(N,N-ethylpropan-1-amine) as a modifier (molar ratio of [modifier]:[act. Li]=0.7:1).

Comparative Example 4

A modified styrene-butadiene copolymer was prepared by performing the same method as in Example 1 except for using the solution containing a macromonomer prepared in the Preparation Example instead of n-butyllithium in Example 1 in an amount such that the mol of the macromonomer injected was the same as the n-butyllithium in Example 1, performing the adiabatic reaction with heating, not performing a subsequent step of adding a modifier and a macromonomer and performing reaction, and quenching the reaction after capping butadiene.

Comparative Example 5

A modified styrene-butadiene copolymer was prepared by performing the same method as in Example 1 except for using the solution containing a macromonomer prepared in the Preparation Example instead of n-butyllithium in Example 1 in an amount such that the mol of the macromonomer injected was the same as the n-butyllithium in Example 1, performing the adiabatic reaction with heating, not performing a subsequent step of adding a macromonomer and performing reaction after modification reaction, and quenching the reaction.

Experimental Example 1

With respect to each of the modified styrene-butadiene copolymers prepared in the Examples and Comparative Examples, the rate of change of molecular weight distribution, the rate of change of mooney viscosity, the vinyl content, a weight average molecular weight (Mw, ×10³ g/mol), a number average molecular weight (Mn, ×10³ g/mol), molecular weight distribution (PDI, MWD), and mooney viscosity (MV) were measured, respectively. The results are shown in Table 1 below.

1) Styrene Unit and Vinyl Contents (Wt %)

The styrene unit (SM) and vinyl contents in each polymer were measured and analyzed using Varian VNMRS 500 MHz NMR.

When measuring NMR, 1,1,2,2-tetrachloroethane was used as a solvent, and styrene unit and vinyl contents were calculated by calculating a solvent peak as 5.97 ppm, and regarding 7.2-6.9 ppm as random styrene peaks, 6.9-6.2 ppm as block styrene peaks, 5.8-5.1 ppm as 1,4-vinyl peaks, and 5.1-4.5 ppm as 1,2-vinyl peaks.

2) Weight Average Molecular Weight (Mw, ×10³ g/Mol), Number Average Molecular Weight (Mn, ×10³ g/Mol), and Molecular Weight Distribution (PDI, MWD)

By gel permeation chromatography (GPC) analysis, a weight average molecular weight (Mw) and a number average molecular weight (Mn) were measured. In addition, molecular weight distribution (PDI, MWD, Mw/Mn) was calculated from each molecular weight thus measured. Particularly, GPC was conducted using two columns of PLgel Olexis (Polymer Laboratories Co.) and one column of PLgel mixed-C (Polymer Laboratories Co.) in combination, and polystyrene (PS) as a GPC standard material for calculating the molecular weights. A solvent for measuring GPC was prepared by mixing tetrahydrofuran with 2 wt % of an amine compound.

In addition, the rate of change (%) of molecular weight distribution was obtained by standing each polymer at 25° C. for 90 days, measuring a weight average molecular weight and a number average molecular weight by the above-described method, obtaining molecular weight distribution ($PDI_2$) therefrom, and calculating through Mathematical Formula 1 below.

Rate of change of molecular weight distribution (%)=[(|$PDI_2$−$PDI_1$|)/$PDI_1$]×100    [Mathematical Formula 1]

In Mathematical Formula 1,
PDI$_1$ is molecular weight distribution before standing, and PDI$_2$ is molecular weight distribution after standing for 90 days at 25° C.

3) Mooney Viscosity and Rate of Change of Mooney Viscosity

The mooney viscosity (MV, (ML1+4, @100° C.) MU) was measured by using MV-2000 (ALPHA Technologies Co.) using Large Rotor at a rotor speed of 2±0.02 rpm at 100° C. In this case, a specimen used was stood at room temperature (23±3° C.) for 30 minutes or more, and 27±3 g of the specimen was collected and put in a die cavity, and then, Platen was operated for 4 minutes for measurement.

In addition, the rate of change (%) of mooney viscosity was obtained by standing each polymer at 25° C. for 90 days, obtaining mooney viscosity (MV$_2$) by the above-described method, and calculating through Mathematical Formula 2 below.

Rate of change of mooney viscosity M %=[|(MV$_2$−MV$_1$)|/MV$_1$]×100     [Mathematical Formula 2]

In Mathematical Formula 2,
MV$_1$ is mooney viscosity measured at 100° C. of a polymer before standing, and MV$_2$ is mooney viscosity measured at 100° C. of a polymer after standing for 90 days at 25° C.

TABLE 1

| Division | | Example | | | Comparative Example | | | | |
|---|---|---|---|---|---|---|---|---|---|
| | | 1 | 2 | 3 | 1 | 2 | 3 | 4 | 5 |
| NMR (wt %) | SM | 21.0 | 21.0 | 21.2 | 20.7 | 20.6 | 21.1 | 20.3 | 21.2 |
| | Vinyl | 50.2 | 50.5 | 50.0 | 50.1 | 49.6 | 50.7 | 50.2 | 49.0 |
| GPC | Mn (×10³, g/mol) | 365 | 388 | 370 | 380 | 394 | 407 | 394 | 380 |
| | Mw (×10³, g/mol) | 481 | 624 | 611 | 467 | 618 | 621 | 453 | 505 |
| | PDI$_1$ | 1.32 | 1.61 | 1.65 | 1.23 | 1.57 | 1.53 | 1.15 | 1.33 |
| | Rate of change of molecular weight distribution (%) | 3.8 | 7.1 | 8.3 | 11.3 | 11.0 | 14.8 | 1.7 | 12.8 |
| | Mooney viscosity (MV$_1$) | 56 | 78 | 84 | 53 | 74 | 79 | 51 | 60 |
| | Rate of change of mooney viscosity (%) | 3.6 | 7.6 | 6.7 | 13.2 | 14.9 | 12.3 | 2.0 | 15.0 |

As shown in Table 1 above, it was confirmed that Example 1 to Example 3 showed that the rate of change of molecular weight distribution was 10% or less, and further, the rate of change of mooney viscosity was 10% or less.

On the contrary, Comparative Example 1 to Comparative Example 3 and Comparative Example 5 showed that the rate of change of molecular weight distribution was greater than 10%, and the rate of change of mooney viscosity was greater than 10%. Meanwhile, Comparative Example 4 showed the rate of change of molecular weight distribution and the rate of change of mooney viscosity of 10% or less, but was an unmodified polymer not including a functional group derived from an aminoalkoxysilane-based modifier, and as confirmed in Table 3 below, all physical properties measured were markedly deteriorated in contrast to those of the Examples.

Experimental Example 2

In order to compare and analyze the physical properties of rubber compositions including the modified styrene-butadiene copolymers prepared in the Examples and Comparative Examples, and molded articles manufactured therefrom, tensile properties and viscoelasticity properties were measured, respectively, and the results are shown in Table 3 below.

1) Preparation of Rubber Specimen

Blending was performed using each of the modified styrene-butadiene copolymers of the Examples and Comparative Examples as a raw material rubber under the compounding conditions shown in Table 2 below. The raw materials in Table 2 are represented by parts by weight based on 100 parts by weight of the raw material rubber.

TABLE 2

| Division | Raw material | Amount (parts by weight) |
|---|---|---|
| First stage mulling | Rubber | 100 |
| | Silica | 70 |
| | Coupling agent (X50S) | 11.2 |
| | Process oil | 37.5 |
| | Zinc white | 3 |
| | Stearic acid | 2 |
| | Antioxidant | 2 |
| | Antiaging agent | 2 |
| | wax | 1 |
| Second stage mulling | Sulfur | 1.5 |
| | Rubber accelerator | 1.75 |

TABLE 2-continued

| Division | Raw material | Amount (parts by weight) |
|---|---|---|
| | Vulcanization accelerator | 2 |

Particularly, the rubber specimen was mulled via a first stage mulling and a second stage mulling. In the first stage mulling, a raw material rubber, silica (filler), an organic silane coupling agent (X50S, Evonik), a process oil (TADE oil), zinc oxide (ZnO), stearic acid, an antioxidant (TMQ (RD)) (2,2,4-trimethyl-1,2-dihydroquinoline polymer), an antiaging agent (6PPD ((dimethylbutyl)-N-phenyl-phenylenediamine) and wax (Microcrystaline Wax) were mulled using a banbury mixer equipped with a temperature controlling apparatus. In this case, the initial temperature of a mulling apparatus was controlled to 70° C., and after finishing mixing, a first compound mixture was obtained at a discharge temperature of 145° C. to 155° C. In the second stage mulling, the first compound mixture was cooled to room temperature, and the first compound mixture, sulfur, a rubber accelerator (diphenylguanine (DPG)), and a vulcanization accelerator (N-cyclohexyl-2-benzothiazylsulfenamide (CZ)) were added to the mulling apparatus and mixed at a temperature of 100° C. or less to obtain a second compound mixture. Then, via a curing process at 160° C. for 20 minutes, a rubber specimen was formed.

2) Tensile Properties

For measuring the tensile properties, each test specimen was manufactured and tensile strength when breaking and tensile stress when stretched by 300% (300% modulus) of each specimen were measured according to an ASTM 412 tensile test method. Particularly, tensile properties were measured using a Universal Test Machin 4204 tensile tester (Instron Co.) in a rate of 50 cm/min at room temperature.

3) Viscoelasticity Properties

The viscoelasticity properties were secured by measuring viscoelasticity behavior on thermodynamic deformation at each measurement temperature (−60° C.–60° C.) with a frequency of 10 Hz by using a dynamic mechanical analyzer (GABO Co.) in a film tension mode and securing a tan δ value. From the resultant values, if a tan δ value at a low temperature of 0° C. increases, wet skid resistance becomes better, and if a tan δ at a high temperature of 60° C. decreases, hysteresis loss decreases, and rotation resistance (fuel consumption ratio) becomes better.

4) Processability Properties

By measuring the mooney viscosity (MV, (ML1+4, @100° C.) MU) of the first compound mixture obtained during 1) preparation of rubber specimen, the processability properties of each polymer was compared and analyzed, and in this case, the lower the measured value of the mooney viscosity is, the better the processability properties are.

Particularly, by using MV-2000 (ALPHA Technologies Co.) using Large Rotor at a rotor speed of 2±0.02 rpm at 100° C., each first compound mixture was stood at room temperature (23±3° C.) for 30 minutes or more, and 27±3 g was collected and put in a die cavity, and then, Platen was operated for 4 minutes for measurement.

TABLE 3

| Division | | Example | | | Comparative Example | | | | |
|---|---|---|---|---|---|---|---|---|---|
| | | 1 | 2 | 3 | 1 | 2 | 3 | 4 | 5 |
| Tensile properties | 300% modulus (kgf/cm$^2$) | 160 | 157 | 163 | 147 | 145 | 145 | 148 | 163 |
| Viscoelasticity properties (Index, %) | tan δ (at 0° C.) | 100 | 98 | 100 | 100 | 102 | 99 | 100 | 101 |
| | tan δ (at 60° C.) | 118 | 118 | 115 | 100 | 102 | 98 | 101 | 116 |
| Processability properties (Index, %) | | 103 | 102 | 99 | 100 | 98 | 102 | 94 | 76 |

In Table 3, the tan δ and processability properties of Examples 1 to 3, and Comparative Example 2 to Comparative Example 5 were indexed based on the measurement values of Comparative Example 1 of 100.

As shown in Table 3 above, Example 1 to Example 3 showed excellent effects of wet skid resistance (tan δ at 0° C.), processability properties, 300% modulus and rotation resistance (tan δ at 60° C.) in contrast to Comparative Example 1 to Comparative Example 5.

Particularly, Example 1 to Example 3 showed equal or better wet skid resistance and processability properties when compared with Comparative Example 1 to Comparative Example 3, and showed markedly improved effects of 300% modulus of at least 7%, and rotation resistance of at least 13%. In addition, each of Example 1 to Example 3 showed largely improved effects of 300% modulus, rotation resistance and processability properties by 5% or more in contrast to Comparative Example 4 and showed markedly improved effects of processability properties by 30% or more in contrast to Comparative Example 5.

In this case, Comparative Example 1 to Comparative Example 3 and Comparative Example 5 corresponded to polymers including the functional group derived from an aminoalkoxysilane-based modifier, but not satisfying the conditions of the rate of change of molecular weight distribution suggested by the present invention, Comparative Example 4 corresponded to a polymer satisfying the rate of change of molecular weight distribution suggested in the present invention, but not including the functional group derived from an aminoalkoxysilane-based modifier, and particularly, Comparative Example 5 corresponded to a polymer prepared by the same method as in Example 1 except for using the macromonomer suggested in the present invention as a modification polymerization initiator and not performing a step of adding a macromonomer and reacting after modification reaction.

From the results, it was confirmed that the modified conjugated diene-based polymer according to an embodiment of the present invention includes a functional group derived from an aminoalkoxysilane-based modifier in a polymer, and at the same time, satisfies the conditions on the rate of change of molecular weight distribution of 10% or less, thereby achieving excellent effects of tensile properties, viscoelasticity properties and processability properties in balance.

The invention claimed is:

1. A modified conjugated diene-based polymer, comprising:
   a repeating unit derived from a conjugated diene-based monomer; and
   a functional group derived from an aminoalkoxysilane-based modifier,
   wherein the modified conjugated diene-based polymer having a rate of change of molecular weight distribution of 10% or less, wherein the rate of change of molecular weight distribution is calculated by the following Mathematical Formula 1:

Rate of change of molecular weight distribution (%)=[(|PDI$_2$−PDI$_1$|)/PDI$_1$]×100    [Mathematical Formula 1]

in Mathematical Formula 1,
   PDI$_1$ is molecular weight distribution of the polymer before standing, and PDI$_2$ is molecular weight distribution of the polymer after standing for 90 days at 25° C.

2. The modified conjugated diene-based polymer of claim 1, wherein the modified conjugated diene-based polymer having a rate of change of mooney viscosity of 10% or less, wherein the rate of change of mooney viscosity is calculated by the following Mathematical Formula 2:

Rate of change of mooney viscosity (%)=[|(MV$_2$−MV$_1$)|/MV$_1$]×100    [Mathematical Formula 2]

in Mathematical Formula 2,
   MV$_1$ is mooney viscosity measured at 100° C. of the polymer before standing, and MV$_2$ is mooney viscosity measured at 100° C. of the polymer after standing for 90 days at 25° C.

3. The modified conjugated diene-based polymer of claim 1, further comprising:
a derived unit from a macromonomer, wherein
the macromonomer comprises a repeating unit derived from a N-functional group-containing monomer.

4. The modified conjugated diene-based polymer of claim 1, further comprising:
a first chain comprising the repeating unit derived from a conjugated diene-based monomer;
a second chain comprising a derived unit from a macromonomer,
wherein the macromonomer comprises a repeating unit derived from a N-functional group-containing monomer.

5. The modified conjugated diene-based polymer of claim 3, wherein the macromonomer further comprises a repeating unit derived from a conjugated diene-based monomer.

6. The modified conjugated diene-based polymer of claim 1, comprising silicon (Si),
wherein the Si content is 100 ppm or more based on a total weight of the polymer.

7. The modified conjugated diene-based polymer of claim 1, comprising nitrogen (N),
wherein the N content is 70 ppm or more based on a total weight of the polymer.

8. The modified conjugated diene-based polymer of claim 1, wherein the aminoalkoxysilane-based modifier is one or more selected from compounds represented by the following Formula 1 to Formula 3:

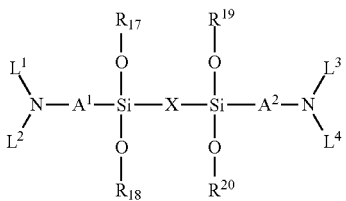

[Formula 1]

in Formula 1,
$A^1$ and $A^2$ are each independently an alkylene group of 1 to 20 carbon atoms,
$R^{17}$ to $R^{20}$ are each independently an alkyl group of 1 to 20 carbon atoms
$L^1$ to $L^4$ are each independently a mono-substituted, di-substituted or tri-substituted alkylsilyl group with alkyl groups of 1 to 10 carbon atoms, or an alkyl group of 1 to 20 carbon atoms, and
X is an oxygen atom, or an alkylene group of 1 to 20 carbon atoms,

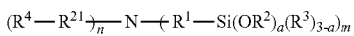

[Formula 2]

in Formula 2,
$R^1$ is a single bond, or an alkylene group of 1 to 10 carbon atoms,
$R^2$ and $R^3$ are each independently an alkyl group of 1 to 10 carbon atoms,
$R^4$ is hydrogen, an epoxy group, an alkyl group of 1 to 10 carbon atoms, an allyl group of 2 to 10 carbon atoms, a mono-substituted, di-substituted or tri-substituted alkylsilyl group with alkyl groups of 1 to 10 carbon atoms, or a heterocyclic group of 2 to 10 carbon atoms,
$R^{21}$ is a single bond, an alkylene group of 1 to 10 carbon atoms, or $—[R^{42}O]_j—$, where $R^{42}$ is an alkylene group of 1 to 10 carbon atoms, and j is an integer selected from 1 to 30,
a and m are each independently an integer selected from 1 to 3, and
n is an integer of 0 to 2,

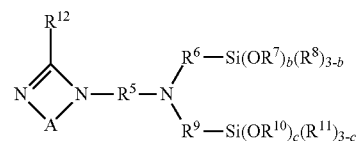

[Formula 3]

in Formula 3,
$R^5$, $R^6$ and $R^9$ are each independently an alkylene group of 1 to 10 carbon atoms,
$R^7$, $R^8$, $R^{10}$ and $R^{11}$ are each independently an alkyl group of 1 to 10 carbon atoms,
$R^{12}$ is hydrogen or an alkyl group of 1 to 10 carbon atoms,
b and c are each independently 1, 2 or 3, where b+c≥4 is satisfied, and
A is

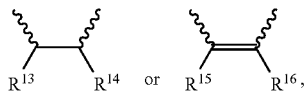

where $R^{13}$, $R^{14}$, $R^{15}$ and $R^{16}$ are each independently hydrogen or an alkyl group of 1 to 10 carbon atoms.

9. The modified conjugated diene-based polymer of claim 1, further comprising a repeating unit derived from an aromatic vinyl-based monomer.

10. A rubber composition, comprising:
the modified conjugated diene-based polymer of claim 1; and
a filler.

11. The rubber composition of claim 10, wherein the filler is one or more selected from a silica-based filler and a carbon black-based filler.

* * * * *